US011207804B2

(12) United States Patent
Reinhold

(10) Patent No.: US 11,207,804 B2
(45) Date of Patent: Dec. 28, 2021

(54) DEVICE AND METHOD FOR PRODUCING PREFORMS

(71) Applicant: Broetje-Automation GmbH, Rastede (DE)

(72) Inventor: Raphael Reinhold, Wittmund (DE)

(73) Assignee: Broetje-Automation GmbH, Rastede (DE)

( * ) Notice: Subject to any disclaimer, the term of this patent is extended or adjusted under 35 U.S.C. 154(b) by 80 days.

(21) Appl. No.: 16/769,861

(22) PCT Filed: Dec. 6, 2018

(86) PCT No.: PCT/EP2018/083837
§ 371 (c)(1),
(2) Date: Jun. 4, 2020

(87) PCT Pub. No.: WO2019/110745
PCT Pub. Date: Jun. 13, 2019

(65) Prior Publication Data
US 2021/0197423 A1 Jul. 1, 2021

(30) Foreign Application Priority Data
Dec. 8, 2017 (DE) ...................... 10 2017 011 312.2

(51) Int. Cl.
*B29C 35/08* (2006.01)
*B29B 11/16* (2006.01)
(Continued)

(52) U.S. Cl.
CPC .......... *B29C 35/0805* (2013.01); *B29B 11/16* (2013.01); *B29C 70/545* (2013.01);
(Continued)

(58) Field of Classification Search
CPC ............ B29C 33/06; B29C 2035/0822; B29C 2045/0075; B29C 59/16; B29C 59/007;
(Continued)

(56) References Cited

U.S. PATENT DOCUMENTS

| 4,790,257 | A | 12/1988 | Schermutzki |
| 5,002,476 | A | 3/1991 | Kerr |
| 2014/0183784 | A1 | 7/2014 | Bartel et al. |

FOREIGN PATENT DOCUMENTS

| CN | 103624996 | 3/2014 |
| DE | 10151761 | 4/2003 |

(Continued)

OTHER PUBLICATIONS

"German Search Report," for German Patent Application No. 102017011312.2 dated Apr. 10, 2018 (8 pages).

(Continued)

*Primary Examiner* — Stella K Yi
(74) *Attorney, Agent, or Firm* — Pauly, DeVries Smith & Deffner LLC

(57) ABSTRACT

Various embodiments relate to a device for the production of preforms for aircraft structural components, having a supply unit for the continuous supply of a layer structure with at least one fiber layer, having a heating unit with at least one infrared heater which has an infrared radiation source, wherein the supplied layer structure is passed through the heating unit in a conveying direction and can be heated there over at least part of its width in cross section by the at least one infrared heater, a disk which is permeable to infrared radiation being arranged between the layer structure and the infrared heater.

20 Claims, 7 Drawing Sheets

(51) Int. Cl.
*B29C 70/54* (2006.01)
*B29L 31/30* (2006.01)

(52) U.S. Cl.
CPC .............. *B29C 2035/0822* (2013.01); *B29L 2031/3076* (2013.01)

(58) Field of Classification Search
CPC .............. B29C 65/103; B29C 65/1403; B29C 65/1412; B29C 65/1416; B29C 65/1419; B29C 65/1603; B29C 65/1612; B29C 66/81267
See application file for complete search history.

(56) References Cited

FOREIGN PATENT DOCUMENTS

| | | |
|---|---|---|
| DE | 60118048 | 5/2006 |
| DE | 102006016400 | 3/2007 |
| DE | 102010014704 | 10/2011 |
| DE | 102011090143 | 7/2013 |
| DE | 102013109477 | 3/2015 |
| DE | 102014004053 | 9/2015 |
| EP | 1116575 | 7/2001 |
| EP | 2018950 | 1/2009 |
| EP | 2805802 | 11/2014 |
| WO | 2019110745 | 6/2019 |

OTHER PUBLICATIONS

Henninger, F. et al., "Production of Textile Reinforced Thermoplastic Profiles by Roll Forming," Composites: Part A 35 (2004) 573-583 (11 pages).

"International Search Report and Written Opinion," for PCT Application No. PCT/EP2018/083837 dated Mar. 21, 2019 (14 pages).

DEVICE AND METHOD FOR PRODUCING PREFORMS

CROSS-REFERENCE TO RELATED APPLICATIONS

This application is a national stage application under 35 U.S.C. 371 of International Patent Application Serial No. PCT/EP2018/083837, entitled "Device and Method for Producing Preforms," filed Dec. 6, 2018, which claims priority from German Patent Application No. DE 10 2017 011 312.2, filed Dec. 8, 2017, the disclosure of which is incorporated herein by reference.

FIELD OF THE TECHNOLOGY

Various embodiments relate to a device for the production of preforms for aircraft structural components and to a method for the production of preforms for aircraft structural components.

Background

The use of fiber-reinforced materials is currently rapidly on the increase. This applies in particular to glass fiber reinforced or carbon fiber reinforced components, the use of which is increasing due to the ever-rising demand for lightweight solutions. This applies in particular to the aviation and aerospace industry.

However, the automated production of fiber glass reinforced or carbon fiber reinforced components (GFR or CFR components) presents a major challenge. As a result, manual processing still accounts for a large proportion of production in this case.

Many tests on partially or fully automating the process have already been conducted in the past. In order to produce aircraft structural components, in particular stringers and/or frames of an aircraft, DE 10 2010 014 704 A1 proposes, by way of example, a method for the production of preforms for aircraft structural components in which, in a first step, continuously fed fiber layers are shaped by shaping at a right angle into a predetermined cross section and in which, in a second step, the resulting cross-sectional profile is bent through shaping in a longitudinal direction in a predefined manner. It is known in this case for the fiber layers to be radiated using an infrared heater before they are shaped at a right angle, in order to fix to one another the fiber layers still running loosely on one another. It has emerged that through simple radiation of the fiber layers, a uniform heating of said fiber layers can only be achieved with great difficulty. This means that partial regions of the fiber layers are heated excessively while others are not heated sufficiently. In addition, fluctuating environmental conditions have a substantial effect on the quality of the connection between the fiber layers. This leads to substantial quality differences in the component properties of the preforms which are produced.

Summary

The problem addressed by the present disclosure is therefore that of developing and configuring the device described above in such a manner that preforms with uniformly high component properties can be produced by stable process control and a reliable production process.

The aforementioned problem is solved by the features disclosed herein.

The device according to the proposal for the production of preforms for aircraft structural components has a supply unit for the continuous supply of a layer structure with at least one fiber layer. In addition, it has a heating unit with at least one infrared heater which has an infrared radiation source. The supplied layer structure in this case is passed through the heating unit in a conveying direction and heated there over at least part of its width in cross section by the at least one infrared heater. In this case, a disk which is permeable to infrared radiation is arranged between the layer structure and the infrared heater.

In this way, a relatively protected space is created between the fiber layer and the disk in which a highly uniform heating of the layer structure is achieved. Moreover, the influence of environmental changes on the heating process is substantially reduced. For example, the influence of sudden temperature fluctuations in a production hall, such as when a hall door is opened in winter, is substantially reduced in a simple manner and a substantially constant temperature can be maintained substantially more effectively. The influence of environmental influences of this kind is substantially lower due to the provision of a disk than if an infrared heater were simply to be freely positioned over a fiber layer.

In addition, the temperature in the protected space between the layer structure and the disk can also be regulated particularly easily through the energy supply by means of the infrared heater, since a region which is fixedly determined and delimited in terms of its dimensions by the disk and fiber layer is heated.

Moreover, a flow channel can be provided in this way between the layer structure and the disk, which flow channel allows there to be very uniform heating of the layer structure.

This particularly uniform and easily controllable heating means that the process quality during the production of preforms for aircraft structural components is substantially improved by the device as proposed.

According to some embodiments, a cutting unit for cutting the layer structure, in particular along the conveying direction, and/or a transverse shaping unit for shaping the layer structure into a cross-sectional profile may be provided.

Further features relating to the structure of the device and, in particular, to the arrangement of the layer structure and disk in respect of one another are described in various embodiments.

Various embodiments of the infrared heater are described herein. Some embodiments relate to the control of the infrared radiation source.

According to some embodiments, the heating unit has at least one further infrared heater. In this way, an even more homogeneous temperature distribution can be achieved, or else further portions of the layer structure can be efficiently heated.

According to some embodiments, a compacting unit may be provided for the improved connection of fiber layers to one another.

Moreover, the problem described above is solved in terms of a method as described herein.

The same advantages as those described above in connection with the device result. Reference is made to the fact that the method as proposed can be implemented using the device.

Various embodiments provide a device for the production of preforms for aircraft structural components, having a supply unit for the continuous supply of a layer structure with at least one fiber layer, having a heating unit with at least one infrared heater which has an infrared radiation source, wherein the supplied layer structure is passed through the heating unit in a conveying direction and can be heated there over at least part of its width in cross section by the at least one infrared heater, a disk which is permeable to infrared radiation being arranged between the layer structure and the infrared heater.

In some embodiments, the device comprises a cutting unit for cutting the layer structure along the conveying direction and/or a transverse shaping unit for shaping the layer structure into a cross-sectional profile along the conveying direction.

In some embodiments, the distance between the layer structure and the disk is smaller than between the disk and the infrared radiation source of the infrared heater, and/or the distance between the layer structure and the disk is under 10 cm, under 5 cm, under 3 cm, or substantially 1.5 cm.

In some embodiments, the layer structure and the disk form a flow channel, such as via an excess pressure source a gas flow is supplied in the flow channel, in particular in the flow region of the infrared heater.

In some embodiments, the gas flow comprises a direction vector R opposing and/or orthogonal to the conveying direction or is oriented in an opposing or orthogonal manner relative to the conveying direction.

In some embodiments, outlet openings for supplying the gas flow in the flow channel are provided on the fiber layer side of the disk, the outlet openings can be oriented substantially orthogonally to the conveying direction.

In some embodiments, the infrared heater is adjustable relative to the layer structure, in particular transversely and/or orthogonally to the conveying direction.

In some embodiments, the infrared heater comprises a particularly adjustable reflector, by means of which the width can be set transversely to the conveying direction, on which the infrared radiation source takes effect on the layer structure.

In some embodiments, the device has a control, such as the output of the infrared radiation source can be set by means of the control, in particular by pulsing and/or via the intensity of the infrared radiation source.

In some embodiments, the heating unit has at least one further infrared heater, at least one infrared heater, or at least two infrared heaters, is/are provided which heat the layer structure from above, and/or at least one infrared heater or at least two infrared heaters, is/are provided which heat the layer structure from below.

In some embodiments, a compacting unit for compressing the layer structure is provided, such as a compacting unit is provided before and/or after the entry of the fiber layers into the heating unit and/or before and/or after the exit of the fiber layers from the heating unit.

Various embodiments provide a method for the production of preforms for aircraft structural components, in particular with a device as described herein, wherein a layer structure comprising at least one fiber layer is continuously supplied by a supply unit, the layer structure is passed through a heating unit and heated there over at least part of its width in cross section by at least one infrared heater, the layer structure is conveyed past the infrared heater separated from said infrared heater by a disk which is permeable to infrared radiation.

In some embodiments, the layer structure is heated over its entire width by the heating unit, and/or in the width only a predefined region and/or predefined regions is/are heated using the heating unit, such as a region which is not heated is transversely shaped after it has passed through the heating unit.

In some embodiments, in order to produce preforms (3) with different cross-sectional profiles in the width, different predefined regions are heated using the heating unit.

In some embodiments, the side regions of the layer structure are heated relative to the conveying direction and/or a central region of the layer structure is heated relative to the conveying direction.

BRIEF DESCRIPTION OF THE DRAWINGS

Various embodiments are explained in greater detail below with the help of exemplary embodiments. In the drawing

DETAILED DESCRIPTION

Figure 1:
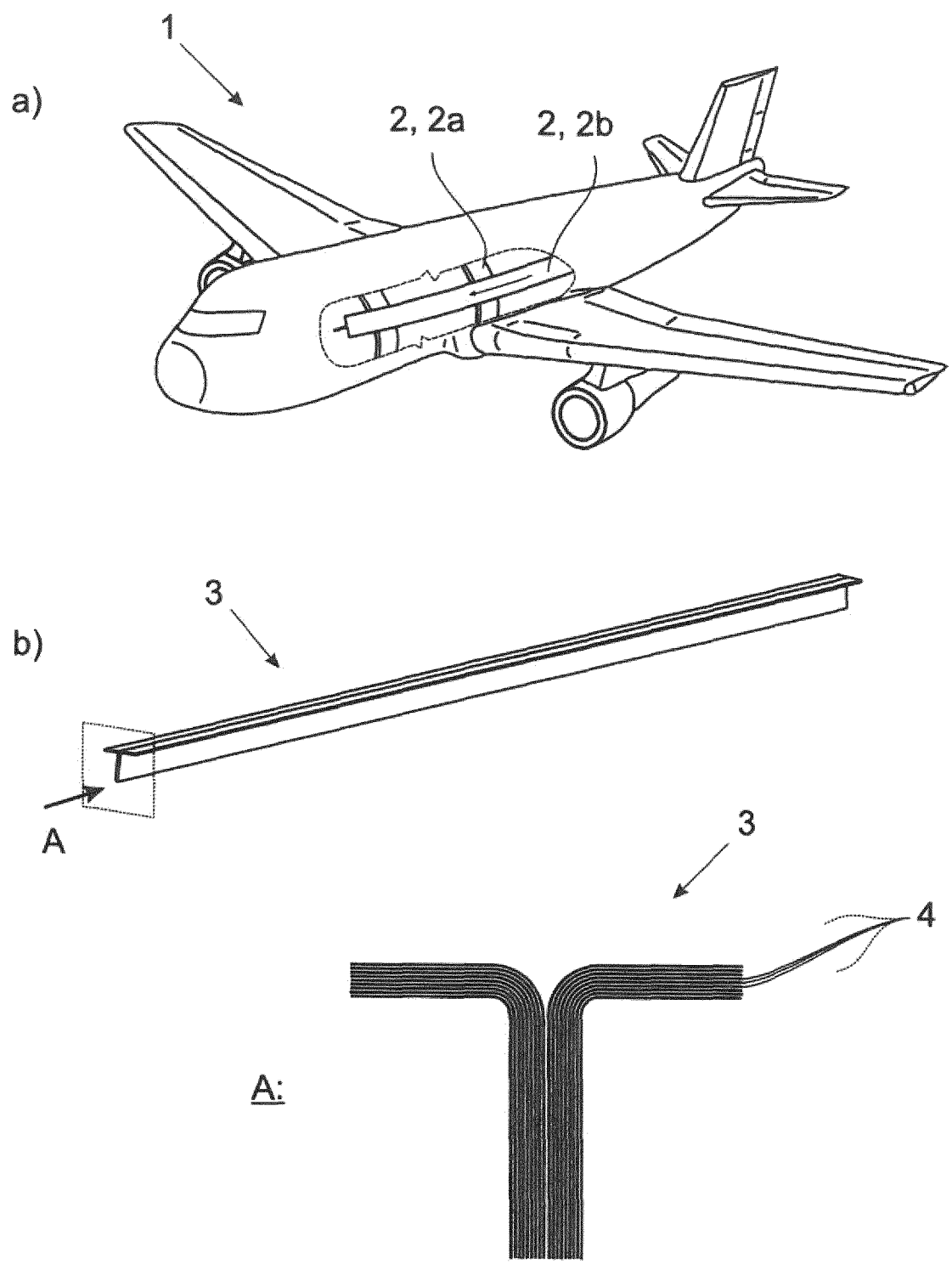
FIG. 1 shows schematically in a) a three-dimensional depiction of an aircraft with an aircraft structural component, schematically in b) a three-dimensional depiction and a cross section through a preform for an aircraft structural component as shown in a) which can be produced using the device as proposed or the method as proposed.

FIG. 1a) shows an aircraft 1 with aircraft structural components 2. In the cutaway view in FIG. 1a), frames 2a and stringers 2b, for example, are shown as aircraft structural components 2 of this kind.

These aircraft structural components 2 are also produced today as fiber-reinforced components. So-called preforms 3 are usually initially used for this purpose. These preforms 3 are then further processed into the aircraft structural components 2.

A preform of this kind is shown in FIG. 1b) in a three-dimensional representation and in section. As can be seen in the figure, this preform comprises in this case multiple fiber layers 4.

The fiber layers 4 comprise a fiber material. This may be dry fibers, rovings, woven fabric, laid fabric, fleece and/or netting. The fiber layers can be prepregs, i.e. pre-impregnated fiber layers. These can be pre-impregnated with a reaction resin, such as with an epoxy resin base.

The preform in the exemplary embodiment has a T-shaped profile. They may, however, also be produced in other profile shapes such as an L-, U- and/or V-shaped profile, for example.

Figure 2:
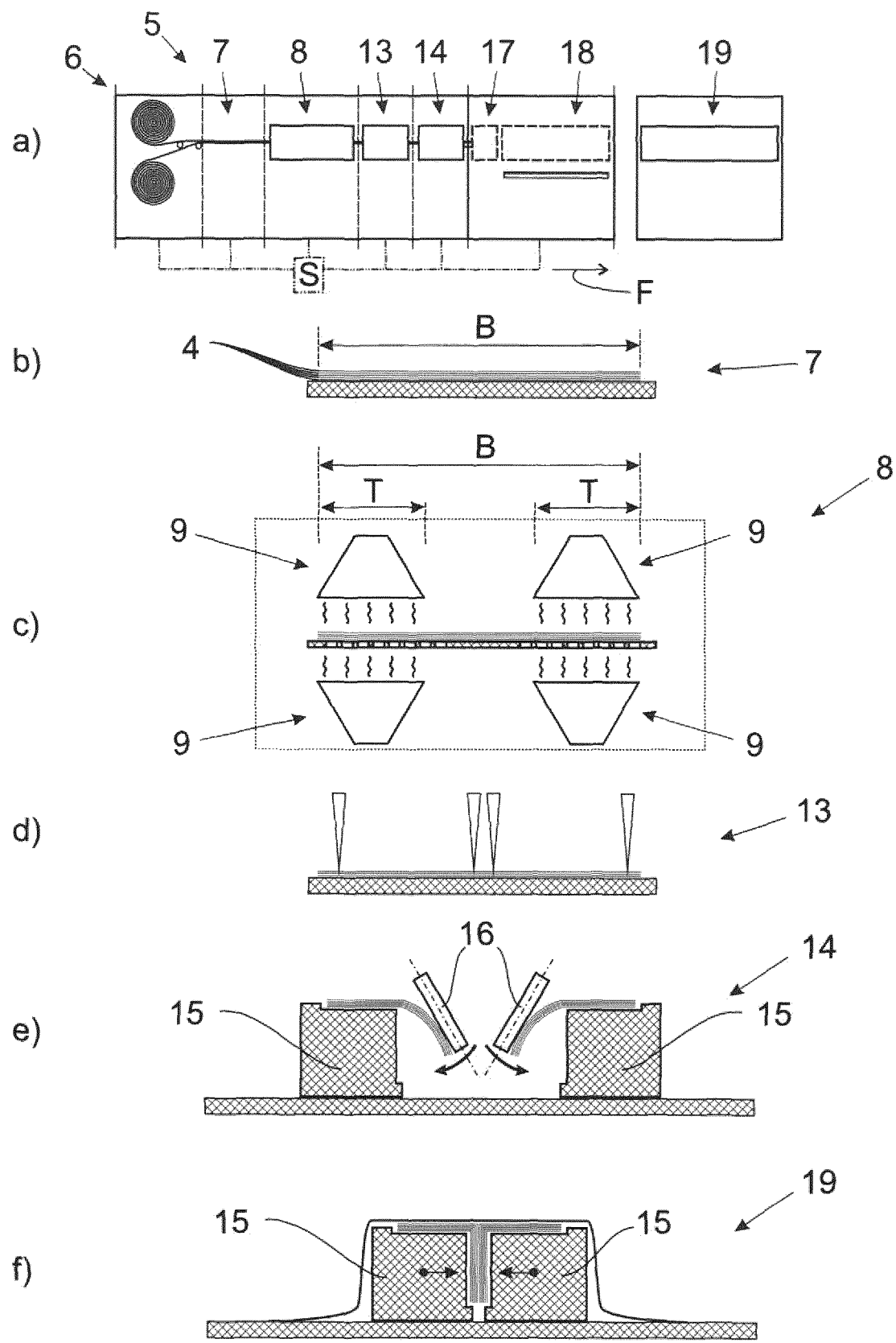
FIG. 2 shows in a) a schematic representation of an exemplary embodiment of the device as proposed or the method as proposed, in b) a schematic representation of the layer structure prior to entering the heating unit in section, in c) a schematic representation in section through the heating unit, in d) a schematic representation in section through the cutting unit, in e) a schematic representation in section through the transverse shaping unit, in f) a schematic representation of the production of the aircraft structural component in an autoclave.

FIG. 2a) shows schematically an exemplary embodiment of a device 5 for the production of a preform 3 in side view. In FIGS. 2b), 2c) and 2d), individual steps involved in the production of the preform 3 are then shown schematically in a sectional representation transversely to the conveying direction F.

The device 5 has a supply unit 6 for the continuous supply of a layer structure 7 with at least one fiber layer 4. In this case, the layer structure 7 has at least two or three fiber layers 4. The layer structure 7 may, in particular, be ready made up, supplied on a roll 8, or multiple rolls 8 of fiber layers 4 may be provided, the fiber layers whereof are combined into a layer structure in the device 5, as is the case in the exemplary embodiment in FIG. 2a).

In addition, the device 5 as proposed comprises a heating unit 8 with at least one infrared heater 9. Said infrared heater comprises an infrared radiation source 10. As shown in FIG. 2a), the layer structure 7 is passed through the heating unit 8 and, as shown in cross section in FIG. 2c, heated in the heating unit 8 over at least one portion T of its width B in cross section by the at least one infrared heater 9. By heating the layer structure 7, in this case, a binder is activated in and/or on the fiber layers 4, which binder connects, in particular adheres, them to one another. In this way, the fiber layers 4 can be connected to one another over their width B, in particular on only one width portion T, so that they are not moved relative to one another in subsequent processing steps, at least in the region of a portion T of this kind.

In principle, the layer structure can be heated by the heating unit 8 over its entire width, but alternatively only a predefined region, or only predetermined regions, in the width can also be heated using the heating unit 8, as is also the case in the exemplary embodiments. In these heated regions, the fiber layers 4 are then connected to one another. In the regions which are not heated, the fiber layers 4 can then still move relative to one another, for example during a subsequent transverse shaping. This relative freedom of movement of the regions which are not heated can be actively used for transverse shaping, so that a non-heated region can be transversely shaped after passing through the heating unit 8.

In some embodiments, only the side regions of the layer structure 7, in particular, are heated relative to the conveying direction F, as is the case in the exemplary embodiment, and/or only a central region of the layer structure 7, in particular, is heated relative to the conveying direction F.

As can further be seen in FIG. 2c), a disk 11 which is permeable to infrared radiation is arranged between the layer structure 7 and the infrared heater 9, as proposed. This structure means that a protected space 12 is created between the layer structure 7 and the disc 11 which at the same time brings with it multiple advantages.

On the one hand, it creates a demarcated region in which the temperature can be set very effectively and adjusted easily, quickly and accurately via the control of the infrared radiation source 10. In addition, it protects the layer structure 7 in the region of the heating unit 8, and therefore the heating process, from environmental influences, in particular sudden temperature drops in the environment, such as those that can be caused by opening a hall door in winter, for example. The result of this is that a particularly uniform heating and a very much more accurate adjustment and maintenance of the temperature of the layer structure 7 in the radiated region (section T) is possible. In this way, the process safety during activation of the binder, and therefore the quality of the preforms 3, can be constantly improved.

Figure 3:
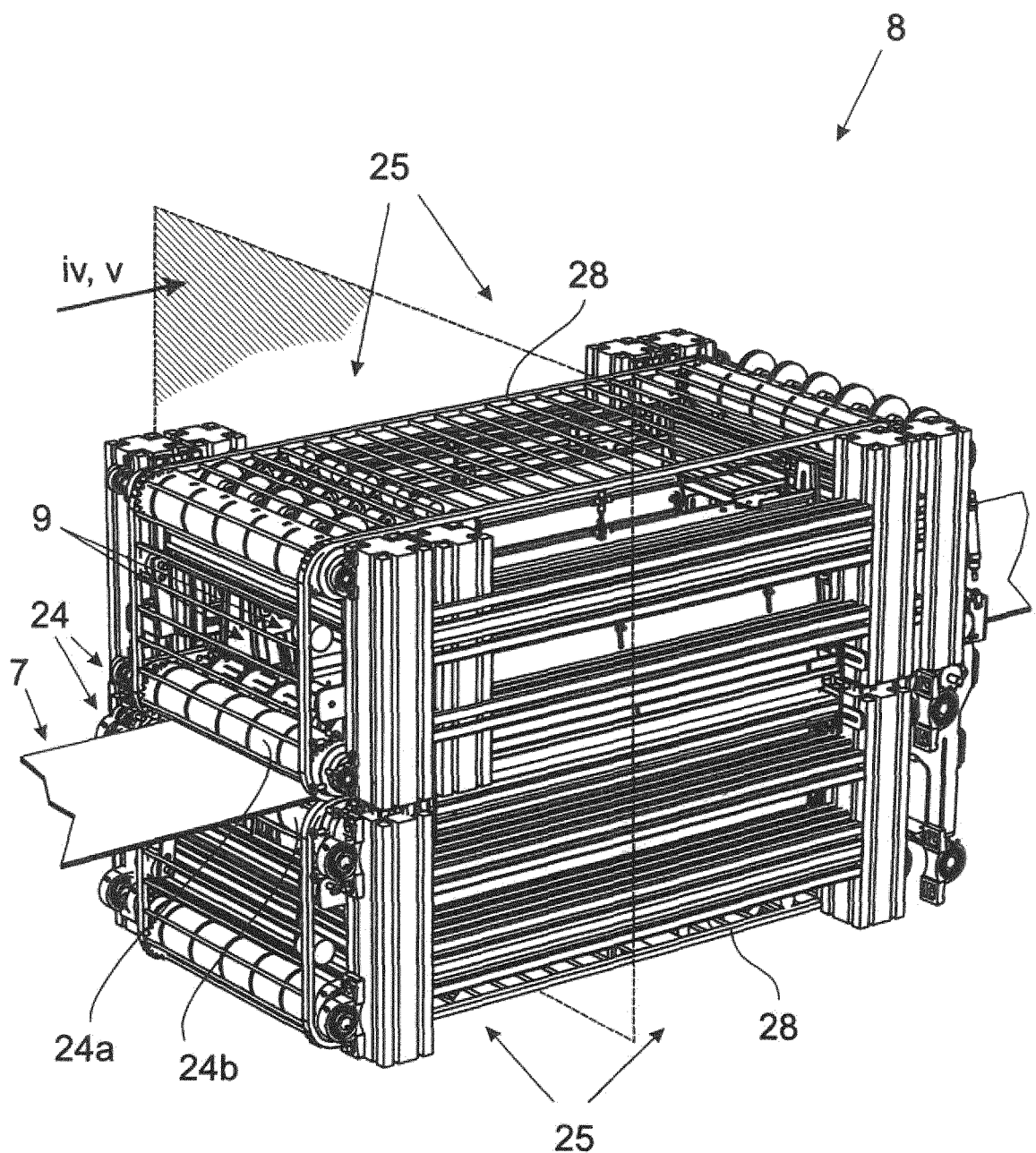
FIG. 3 shows a schematic representation of an exemplary embodiment of the heating unit as a three-dimensional view.

A three-dimensional representation of the heating unit 8 is shown in FIG. 3. This is described in greater detail later with its structural details or the details of the infrared heater 9 with the help of FIGS. 3 to 7.

As shown in FIG. 2a), a cutting unit 13 may be provided behind the heating unit 8. This is shown in cross section orthogonally to the conveying direction F in FIG. 2d). This cutting unit 13 cuts the layer structure 7 in the conveying direction F, in that said layer structure is conveyed through the cutting unit 13. In the exemplary embodiment, a region of the layer structure 7 which is not heated in the heating unit 8 is cut in the conveying direction of the cutting unit 13.

After the heating unit 8, in this case and in addition, a transverse shaping unit 14 is provided which forms the layer structure 7 into a predefined cross-sectional profile. In other words, the layer structure 7 is formed about the conveying direction F. This is shown schematically in FIG. 2e). The transverse shaping can take place by guiding the layer structure 7 over a mold core 15 which continuously adapts to the profile form being produced, against which mold core the layer structure 7 is pressed by means of pressure rollers 16 and shaped. In relation to this, reference is particularly made to application DE 10 2010 014 704 A1, in which this transverse shaping is described.

In particular, if the layer structure 7 is cut in the longitudinal direction by a cutting unit 13 prior to the transverse shaping, as shown in FIG. 2d), the two portions of the layer structure 7a, 7b separated in this manner can be shaped individually in the transverse shaping unit 14, for examples into L-shaped profiles, and then combined, in particular, into a T-shaped profile, as shown in FIG. 2b).

Following the transverse shaping unit 14, a longitudinal shaping unit 17 can be provided. In the longitudinal shaping unit 17, the layer structure 7 can be formed about an axis oriented orthogonally to the conveying direction F, in order to produce a predefined longitudinal curvature, for example. Reference is likewise made to application DE 10 2010 014 704 A1 in this respect, in which this is described.

In addition, a separating unit 18 can be provided which separates continuously produced preforms 3, in particular transversely to the conveying direction F. In addition, a conveying unit 25 may be provided, by means of which the layer structure 7 is conveyed particularly continuously through the device 5. The conveying unit 25 can be integrated in the heating unit 8 and/or arranged behind the heating unit 8. Using the device 1, the preform 3 is thereby continuously produced in this case. The conveying speed during production of the preforms 3 in this case is at least 100 mm/min, at least 200 mm/min, or at least 400 mm/min.

Following separation the preforms 3, in this case, are further processed by means of an autoclave 19 into aircraft structural components 2. In said autoclave they are heated, infiltrated with a reaction resin, where necessary, and hardened. Before or after hardening, the preforms 3 or aircraft structural components 2 can be further processed, in particular trimmed, in a different way.

In addition, an impregnating unit which is not shown may be provided, by means of which the fiber layers 4 running through the device can be equipped locally or completely with a binder system. An impregnating unit of this kind can be integrated in the supply unit 6 and/or arranged in front of the heating unit 8.

The heating unit 8 with the infrared heater 9 is described in greater detail below with the help of FIGS. 3 to 7.

Figure 7:
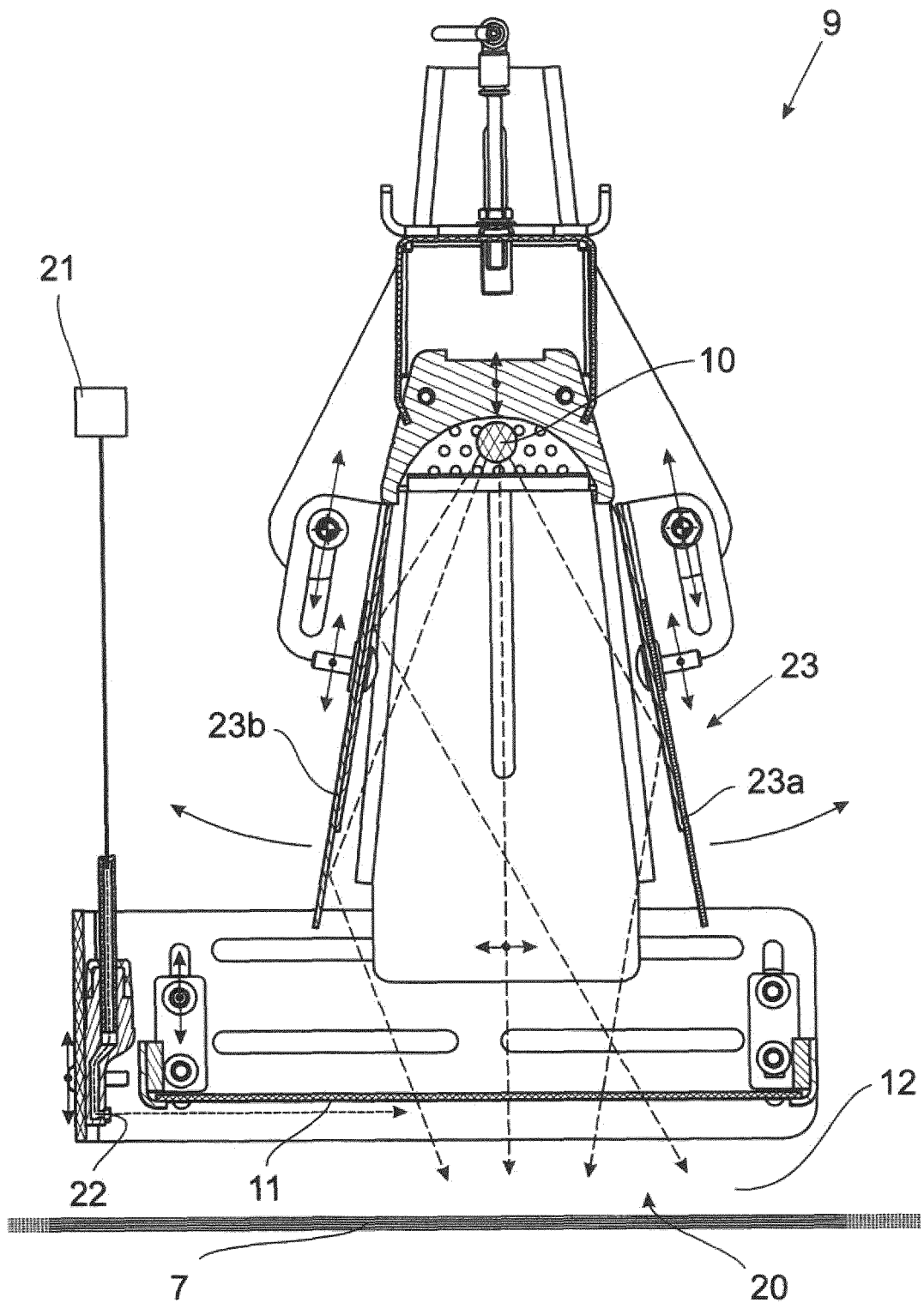
FIG. 7 shows a section through an infrared heater according to FIG. 6.

As already explained, a protected space 12 is provided by the disk 11 and the layer structure 7, which facilitates a more uniform heating of the layer structure 7. For this purpose, in this case, as shown in FIG. 7, the distance between the layer structure 7 and the disk 11 is smaller than between the disk 11 and the infrared radiation source 10 of the infrared heater 9. In this case, the distance between the layer structure 7 and the disk 11 is under 10 cm, under 5 cm, under 3 cm, or substantially 1.5 cm. As can be further inferred from the figure, the disk 11 is substantially arranged parallel to the fiber layer 4 or to the layer structure 7.

The layer structure 7 and the disk 11, in this case, form a flow channel 20. In this case, an excess pressure source 21 is further provided, via which a gas flow is supplied in the flow channel 20, in particular in the flow region of the infrared heater 9. This gas flow may, in particular, be an air flow. In this way, the outer surface of the layer structure 7 can be cooled, so that a more uniform heating of the layer structure, and therefore in particular also of the middle and/or lower layers of the layer structure 7, can be guaranteed. It is therefore proposed during the heating of the layer structure 7 for the outer surface to be cooled by a gas flow, while the layer structure is heated by means of the infrared radiation. Since a greater proportion of the infrared radiation does not penetrate the layer structure as deeply and therefore the upper layer is not greatly heated, in this way a particularly uniform heating of the layer structure can be achieved over the entire radiated cross section.

In this case, a temperature of the layer structure 7 in the radiated region (section T) of 110° C.+/−15° C., +/−10° C., +/−5° C., or +/−2.5° C., is set.

The gas flow may, in particular, comprise a direction vector R opposing and/or orthogonal to the conveying direction F of the layer structure 7. In particular, the gas flow may be oriented in an opposing or orthogonal manner relative to the conveying direction (F). In the exemplary embodiment the gas flow flows through substantially orthogonally to the conveying direction F between the layer structure 7 and the disk 11 in the region of the infrared heater 9.

In this case, outlet openings 22 for supplying the gas flow in the flow channel 20 are provided on the fiber layer side of the disk 11. In this case, these are oriented substantially orthogonally to the conveying direction F and/or parallel to the conveying direction F. The gas flow may be drawn off after flowing over the layer structure 7.

In this case, the infrared heater 9 is adjustable relative to the layer structure 7, in particular transversely and/or orthogonally to the conveying direction F. In this case, the infrared heater 9 is adjusted as a whole for this purpose. In order to produce preforms 3 with a different cross-sectional profile on the same device 5, different predetermined regions can thereby be heated in the width B using the heating unit 8.

In addition, the infrared heater 9 may comprise a particularly adjustable reflector 23. Using this, the width of the section T can be set transversely to the conveying direction F, for example, on which the infrared radiation source 10 takes effect on the layer structure 7.

As shown in FIG. 7, the reflector 23, in this case, comprises two reflector elements 23a, 23b. These are arranged in the conveying direction F to the side of the infrared radiation source 10 and limit its radiation. In this case, they are arranged obliquely relative to a plane parallel to the conveying direction F and orthogonally to the layer structure 7 in the heating unit 8, in some embodiments at an angle between 7° and 15° or between 10° and 12° to the plane. In this way, a particularly uniform heating can be achieved over the region radiated using the infrared radiation source 10. For adjustment, in this case, not only the angle of inclination but also the spacing of the reflector elements 23a, 23b or the lengths thereof can be set.

In this case, the disk 11 is assigned to the infrared heater 9 and fastened thereto. If the infrared heater 9 is adjusted, the disk 11 can therefore be co-adjusted. Alternatively, however, it may also be provided that the disk 11 is not assigned to the infrared heater 9. For example, it may be fixedly installed in the heating unit 8 and only radiated by the infrared heater 9. In this case, here only the infrared heater 9 and with it, where necessary, its reflector 23 is adjusted, but not the disk 11.

In this case, the disk 11 is also adjustable relative to the infrared radiation source 10, as is shown in FIG. 7. It may be adjusted in terms of its spacing from the infrared radiation source 10 and/or substantially parallel to the layer structure 7 relative to the infrared radiation source 10.

In addition or alternatively, the outlet opening 22 may be assigned to the infrared heater 9. The outlet openings 22 in this case are fixedly arranged relative to the disk 11, but they may be adjusted relative to the infrared radiation source 10. The region to be radiated can therefore be adjusted particularly easily in this case, in that the infrared heater 9 is adjustable as a whole relative to the layer structure 7. In this case, the outlet openings 22 are co-adjusted here, so that the gas flow relative to the disk 11 and to the infrared radiation source 10 remains substantially the same.

The infrared radiation source 10 in this case can be operated at 60% to 95% of nominal output. In this case, a radiation spectrum of the infrared radiation source 10 for heating the layer structure 7 results.

The output of the infrared radiation source 10 can be set via its intensity and/or by pulsing the same. The device is regulated by a control S. This also controls the infrared radiation source 10.

Figure 4:
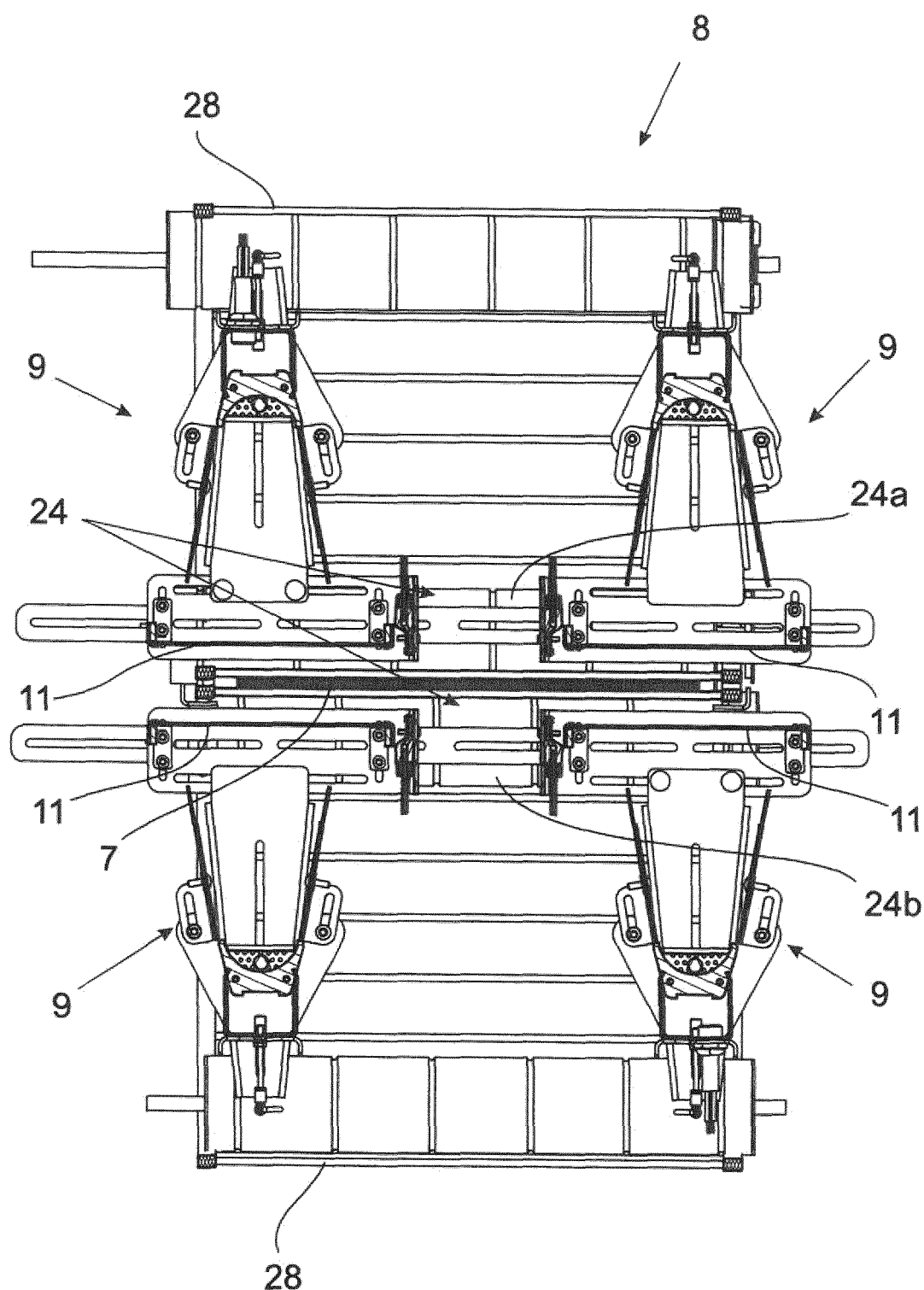
FIG. 4 shows a schematic representation of a section through the heating unit according to IV from FIG. 3.
Figure 5:
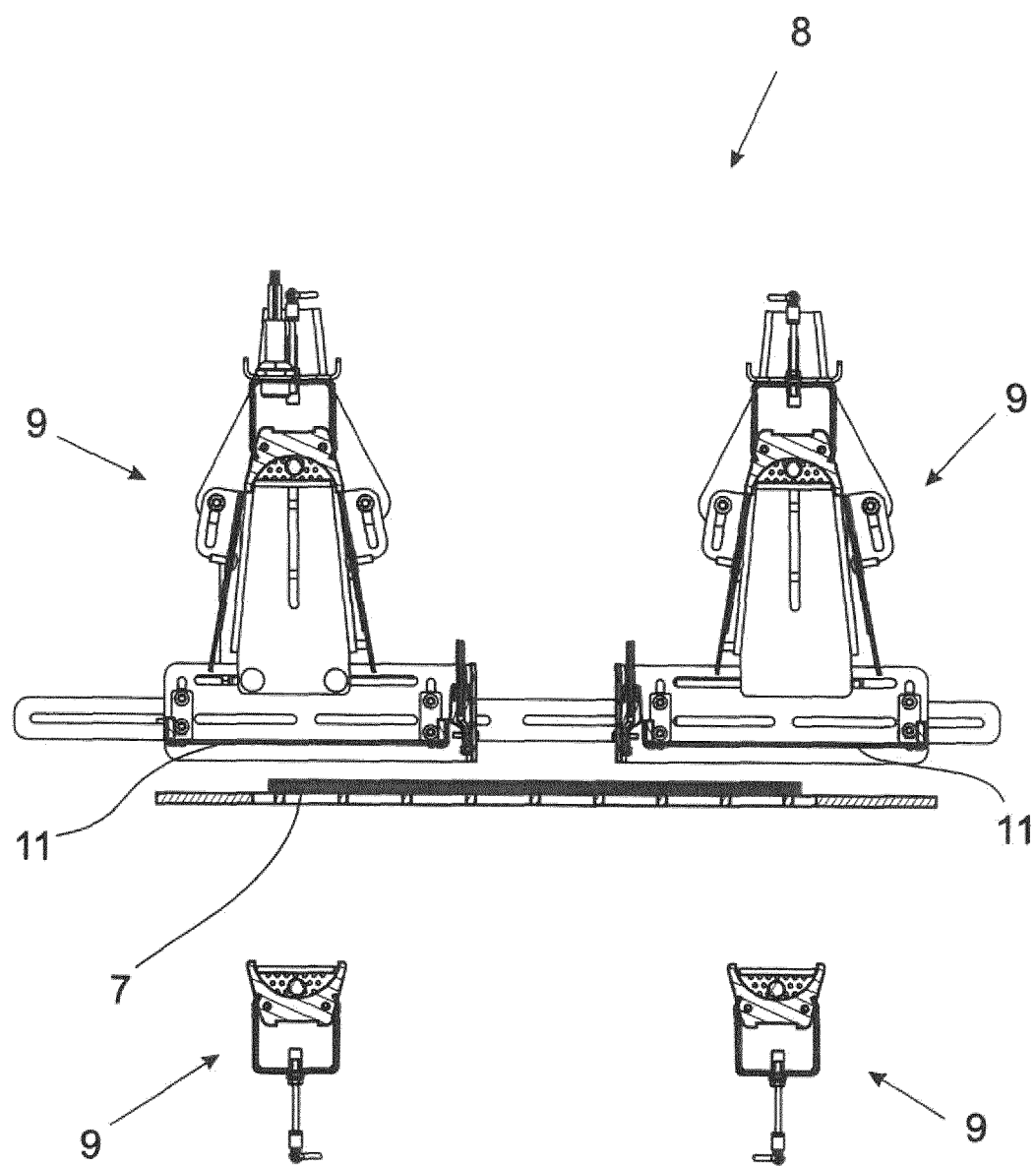
FIG. 5 shows a schematic representation of a section through a further exemplary embodiment similarly to FIG. 4.
Figure 6:
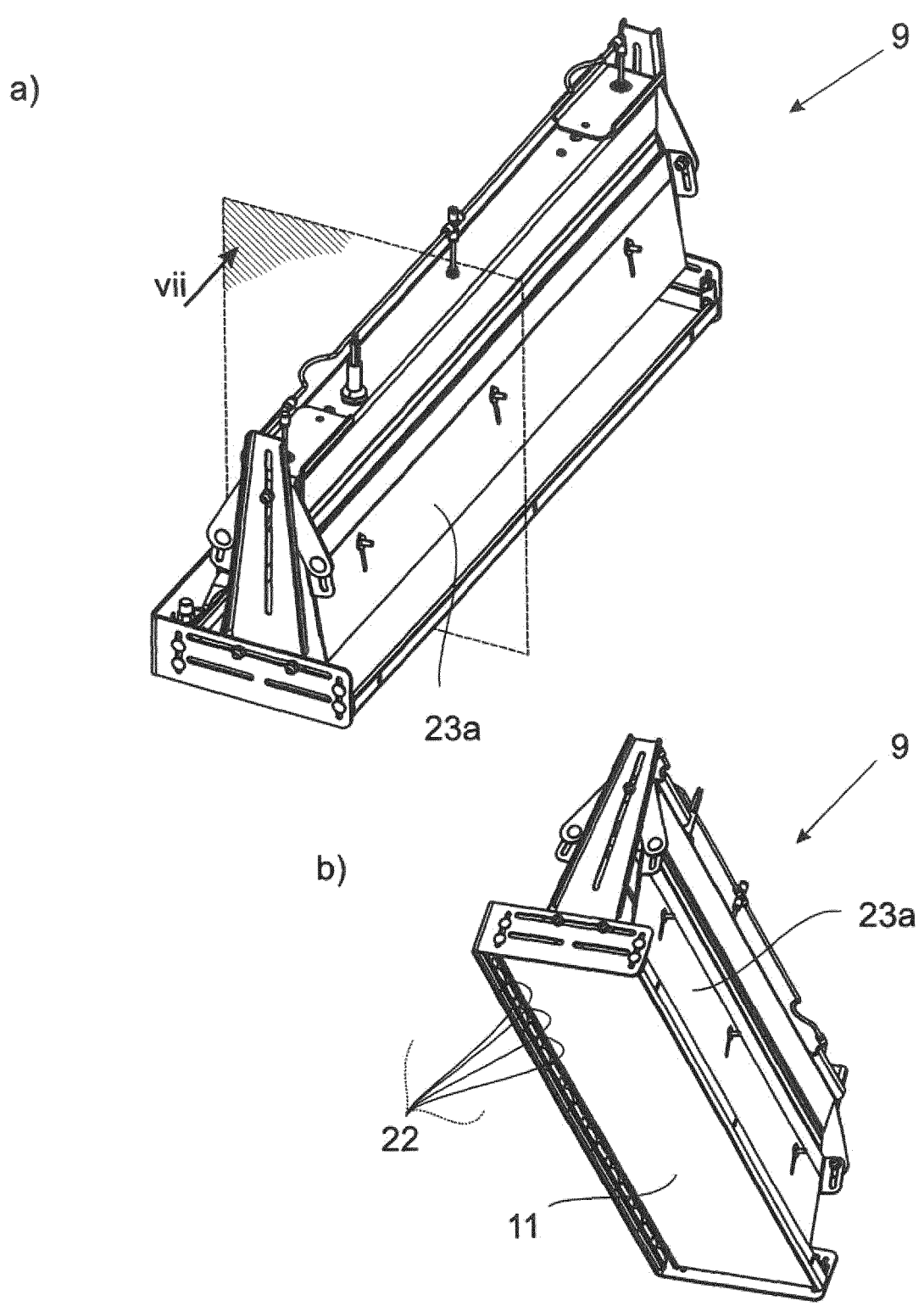
FIG. 6 shows in a) and b) different three-dimensional representations of an infrared heater.

As can be further seen from FIGS. 3 to 5, the heating unit 8 can have not only one infrared heater 9, but at least one further infrared heater 9. In some embodiments at least one infrared heater 9, or at least two infrared heaters 9, is/are provided which heat the layer structure from above, and/or at least one infrared heater 9, or at least two infrared heaters 9, is/are provided which heat the layer structure 7 from below. In the exemplary embodiments, precisely two infrared heaters 9 are provided which heat the layer structure 7 from above and precisely two infrared heaters 9 which heat the layer structure 7 from below.

In this case, the infrared heaters 9 are arranged mirror-symmetrically to the layer structure 7. In this way, the most uniform heating possible of the radiated regions of the layer structure 7 through its cross section can be achieved.

FIG. 3 further shows a compacting unit 24. In this case, a compacting unit 24 for compressing the layer structure 7 before and/or after the entry of the fiber layers 4 into the heating unit 8 and/or before and/or after the exit of the fiber layers 4 from the heating unit 8 is provided. The compacting unit 24 can have rollers 24a, 24b for compression. The rollers, in particular of the compacting unit 24 at the entrance to the heating unit 8, may be heatable.

In the exemplary embodiment in FIG. 4 all infrared heaters 9 are configured as previously described. In some embodiments, they are identical in design. Alternatively, however, as shown in the exemplary embodiment in FIG. 5, the infrared heaters 9 may also be differently designed. In the exemplary embodiment in FIG. 5, disks 11 are only provided between the upper infrared heaters and the layer structure 7. The layer structure 7 is supported from below by a support plate 26 which comprises large-area holes 27 in the radiation region of the lower infrared heater 9, through which the layer structure 7 is heated from below.

In the exemplary embodiment in FIG. 5 the layer structure 7 is supported by a network structure and/or ladder structure 28. This is flexibly designed, in this case as an endless strip. It is used to support and/or convey the layer structure 7 through the heating unit 8. It may be powered for this purpose.

The invention claimed is:

1. A device for production of preforms for aircraft structural components, comprising a supply unit for a continuous supply of a layer structure with at least one fiber layer, having a heating unit with at least one infrared heater which has an infrared radiation source, wherein the continuous supply of a layer structure is passed through the heating unit in a conveying direction and heated there over at least part of its width in cross section by the at least one infrared heater, a disk which is permeable to infrared radiation being arranged between the layer structure and the at least one infrared heater.

2. The device as claimed in claim 1, wherein the device comprises a cutting unit for cutting the layer structure along the conveying direction and/or a transverse shaping unit for shaping the layer structure into a cross-sectional profile along the conveying direction.

3. The device as claimed in claim 1, wherein a distance between the layer structure and the disk is smaller than between the disk and the infrared radiation source of the at least one infrared heater, and/or the distance between the layer structure and the disk is under 10 cm.

4. The device as claimed in claim 1, wherein the layer structure and the disk form a flow channel wherein via an excess pressure source a gas flow is supplied in the flow channel.

5. The device as claimed in claim 4, wherein the gas flow comprises a direction vector R opposing and/or orthogonal to the conveying direction or is oriented in an opposing or orthogonal manner relative to the conveying direction.

6. The device as claimed claim 4, wherein outlet openings for supplying the gas flow in the flow channel are provided on the at least one fiber layer side of the disk.

7. The device as claimed in claim 1, wherein the at least one infrared heater is adjustable relative to the layer structure.

8. The device as claimed in claim 1, wherein the device has a control, wherein an output of the infrared radiation source (10) is set by means of the control.

9. The device as claimed claim 1, wherein the heating unit has at least one further infrared heater which heat the layer structure from above, and/or at least one infrared heater which heat the layer structure from below.

10. The device as claimed in claim 1, wherein a compacting unit for compressing the layer structure is provided.

11. A method for production of preforms for aircraft structural components, in particular with a device as claimed in claim 1, wherein a layer structure comprising at least one fiber layer is continuously supplied by a supply unit, the layer structure is passed through a heating unit and heated there over at least part of its width in cross section by at least one infrared heater, the layer structure is conveyed past the at least one infrared heater separated from said at least one infrared heater by a disk which is permeable to infrared radiation.

12. The method as claimed in claim 11, wherein the layer structure is heated over its entire width by the heating unit, and/or in the width only a predefined region and/or predefined regions is/are heated using the heating unit.

13. The method as claimed in claim 11, wherein in order to produce preforms with different cross-sectional profiles in the width, different predefined regions are heated using the heating unit.

14. The method as claimed in claim 11, wherein the side regions of the layer structure are heated relative to the conveying direction and/or a central region of the layer structure is heated relative to the conveying direction.

15. The device as claimed in claim 6, wherein the outlet openings are oriented substantially orthogonally to the conveying direction.

16. The device as claimed in claim 7, wherein the at least one infrared heater is adjustable relative to the layer structure transversely and/or orthogonally to the conveying direction.

17. The device as claimed in claim 1, wherein the device has a control, wherein the output of the infrared radiation source can be set by the control by pulsing and/or via the intensity of the infrared radiation source.

18. The device as claimed in claim 10, wherein the compacting unit is provided before and/or after an entry of the at least one fiber layers into the heating unit and/or before and/or after an exit of the at least one fiber layers from the heating unit.

19. The method as claimed in claim 12, wherein a region which is not heated is transversely shaped after it has passed through the heating unit.

20. The device as claimed in claim 16, wherein the at least one infrared heater comprises a particularly adjustable reflector, which is configured such that the width can be set transversely to the conveying direction, on which the infrared radiation source (10) takes effect on the layer structure.

* * * * *